United States Patent
Muralidharan et al.

(10) Patent No.: US 12,282,383 B2
(45) Date of Patent: Apr. 22, 2025

(54) APPARATUSES, METHODS, AND COMPUTER PROGRAM PRODUCTS FOR ML ASSISTED SERVICE RISK ANALYSIS OF UNRELEASED SOFTWARE CODE

(71) Applicants: ATLASSIAN PTY LTD., Sydney (AU); ATLASSIAN, INC., San Francisco, CA (US)

(72) Inventors: Karthik Muralidharan, Bangalore (IN); Shashank Prasad Rao, Noida (IN); Sri Vardhamanan A, Chennai (IN)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 267 days.

(21) Appl. No.: 17/449,042

(22) Filed: Sep. 27, 2021

(65) Prior Publication Data
US 2023/0095634 A1   Mar. 30, 2023

(51) Int. Cl.
*G06F 11/07* (2006.01)
*G06F 8/71* (2018.01)
*G06F 11/00* (2006.01)
*G06F 11/30* (2006.01)
*G06N 20/00* (2019.01)

(52) U.S. Cl.
CPC ............ *G06F 11/0784* (2013.01); *G06F 8/71* (2013.01); *G06F 11/004* (2013.01); *G06F 11/301* (2013.01); *G06N 20/00* (2019.01)

(58) Field of Classification Search
CPC .. G06F 11/0784; G06F 11/004; G06F 11/301; G06F 11/302; G06F 11/3065; G06F 8/71; G06N 20/00; G06N 3/08
See application file for complete search history.

(56) References Cited

U.S. PATENT DOCUMENTS

| | | | | |
|---|---|---|---|---|
| 11,392,844 | B1* | 7/2022 | Rao | G06N 20/00 |
| 11,593,675 | B1* | 2/2023 | Garg | G06F 21/54 |
| 11,645,388 | B1* | 5/2023 | Kimball | G06N 20/20 |
| | | | | 726/23 |
| 12,095,787 | B1* | 9/2024 | Seri | H04L 63/1466 |
| 2020/0133753 | A1* | 4/2020 | Olson | G06F 11/0781 |
| 2020/0150953 | A1* | 5/2020 | Smith | G06F 8/75 |
| 2020/0210899 | A1* | 7/2020 | Guo | G06Q 20/4016 |
| 2020/0401397 | A1* | 12/2020 | Thomas | G06F 11/327 |
| 2021/0216444 | A1* | 7/2021 | Gefen | G06F 11/3688 |
| 2021/0342742 | A1* | 11/2021 | G Rao | G06N 20/00 |
| 2021/0374754 | A1* | 12/2021 | Pandian | G06Q 20/4016 |
| 2022/0345457 | A1* | 10/2022 | Jeffords | G06F 21/6218 |
| 2022/0417229 | A1* | 12/2022 | Sood | G06N 20/00 |

(Continued)

*Primary Examiner* — Matthew M Kim
*Assistant Examiner* — Matthew N Putaraksa
(74) *Attorney, Agent, or Firm* — Alston & Bird LLP

(57) ABSTRACT

Methods, apparatuses, or computer program products provide for generating a service risk analysis score data object. A service risk analysis request associated with an unreleased code object is received. One or more service risk analysis attributes are extracted using a service risk analysis layer based at least in part on the unreleased code object. A service risk analysis score data object is generated using a service risk analysis machine learning model based at least in part on the one or more service risk analysis attributes. The service risk analysis score data object is output.

19 Claims, 9 Drawing Sheets

(56) References Cited

U.S. PATENT DOCUMENTS

| | | | |
|---|---|---|---|
| 2023/0018159 A1* | 1/2023 | Barroso | G06F 16/128 |
| 2023/0088784 A1* | 3/2023 | Negussie | G06F 11/008 |
| | | | 717/102 |

* cited by examiner

APPARATUSES, METHODS, AND COMPUTER PROGRAM PRODUCTS FOR ML ASSISTED SERVICE RISK ANALYSIS OF UNRELEASED SOFTWARE CODE

BACKGROUND

Various methods, apparatuses, and systems are configured to provide techniques for generating a service risk analysis score data object for an unreleased code object. Through applied effort, ingenuity, and innovation, these identified deficiencies and problems have been solved by developing solutions that are in accordance with the embodiments of the present invention, many examples of which are described in detail herein.

BRIEF SUMMARY

Embodiments of the present disclosure relate to apparatuses, methods, and computer program products for providing a service risk analysis score data object for a unreleased code object. In example embodiments, a computer-implemented method is provided, the computer-implemented method including receiving a service risk analysis request associated with an unreleased code object. In embodiments, the computer-implemented method further includes extracting, using a service risk analysis layer, one or more service risk analysis attributes based at least in part on the unreleased code object. In embodiments, the computer implemented method further includes generating, using a service risk analysis machine learning model, a service risk analysis score data object based at least in part on the one or more service risk analysis attributes. In embodiments, the computer implemented method further includes outputting the service risk analysis score data object.

In embodiments, the one or more service risk analysis attributes are associated with service risk analysis metadata. In embodiments, the service risk analysis metadata describes at least a source repository identifier and a destination repository identifier.

In embodiments, the service risk analysis metadata further includes at least one of an unreleased code object identifier, a service identifier, a snippet identifier, a branch identifier, a workspace identifier, a scope identifier, a user identifier, one or more reviewer identifiers or one or more associated timestamps.

In embodiments, the service risk analysis score data object comprises at least one service risk analysis score based at least in part on the one or more service risk analysis attributes. In embodiments, the at least one service risk analysis score is based at least in part on a machine learned correlation between the one or more service risk analysis attributes and one or more service alert data objects stored in a historical alert repository.

In embodiments, the unreleased code object is associated with a source repository. In embodiments, the one or more service alert data objects are associated with a destination repository indicated in the service risk analysis request.

In embodiments, receipt of the service risk analysis request is triggered by receiving a pull request, wherein the pull request comprises at least a source repository identifier, an unreleased code object identifier, and a destination repository identifier.

In embodiments, the service risk analysis score data object is further based at least in part on the one or more service risk analysis attributes.

In embodiments, the computer-implemented method further includes determining a priority category for a microservice of a destination repository with which the unreleased code object is associated with. In embodiments, the computer-implemented method further includes updating the service risk analysis score data object based at least in part on the determined priority category of the corresponding microservice.

In embodiments, the computer-implemented further includes causing generation of a service risk analysis interface on one or more client devices, wherein the service risk analysis interface comprises a service risk score element rendered based at least in part on the service risk analysis score data object.

In embodiments, the service risk analysis interface further comprises at least one of a source repository element or a destination repository element rendered based at least in part on the service risk analysis metadata In embodiments, the service risk analysis interface further comprises a predicted alert element rendered based at least in part on the service risk analysis score data object.

In embodiments, the service risk analysis interface further comprises a dependent service risk element based at least in part on the service risk analysis score data object.

In embodiments, the service risk analysis interface further comprises a mitigating action element based at least in part on the service risk analysis score data object.

Embodiments of the present disclosure also relate to apparatuses, methods, and computer program products for training a service risk analysis machine learning model. In example embodiments, a computer-implemented method is provided, the computer-implemented method including accessing a service alert training corpus comprising a plurality of service alert data objects, stacktrace data, and origin code data. In embodiments, the computer-implemented method further includes identifying one or more training feature data objects from the plurality of service alert data objects. In embodiments, the computer-implemented method further includes extracting, utilizing a service risk analysis layer, one or more training service risk analysis attributes from the service alert training corpus based at least in part on the identified training feature data objects. In embodiments, the computer-implemented method further includes training the service risk analysis machine learning model based at least in part on the one or more training service risk analysis attributes.

In embodiments, the computer-implemented method further includes receiving an alert indication associated with a destination repository associated with the service risk analysis machine learning model. In embodiments, the computer-implemented method further includes generating one or more service alert data object based at least in part on the received alert indication. In embodiments, the computer-implemented method further includes storing the one or more service alert data objects in the service alert training corpus.

In embodiments, the computer-implemented method further includes storing the one or more service alert data objects in a historical alert repository.

In embodiments, the computer-implemented method further includes in response to receiving the alert indication, generating a root cause report, wherein the root cause report is indicative of the cause of the alert and the one or more mitigating actions taken in response to the alert indication.

In embodiments, generating the service risk analysis score data object utilizing the service risk analysis machine learning model is based at least in part on a machine learned correlation between the one or more service risk analysis attributes and the one or more origin code objects described by one or more service alert data objects stored in the historical alert repository.

In embodiments, the computer-implemented method further includes storing the service risk analysis machine learning model in an associated memory.

Various other embodiments are also described in the following detailed description and in the attached claims.

BRIEF DESCRIPTION OF THE SEVERAL VIEW OF THE DRAWINGS

Having thus described some embodiments in general terms, references will now be made to the accompanying drawings, which are not drawn to scale, and wherein:

DETAILED DESCRIPTION OF VARIOUS EMBODIMENTS

Figure 1:
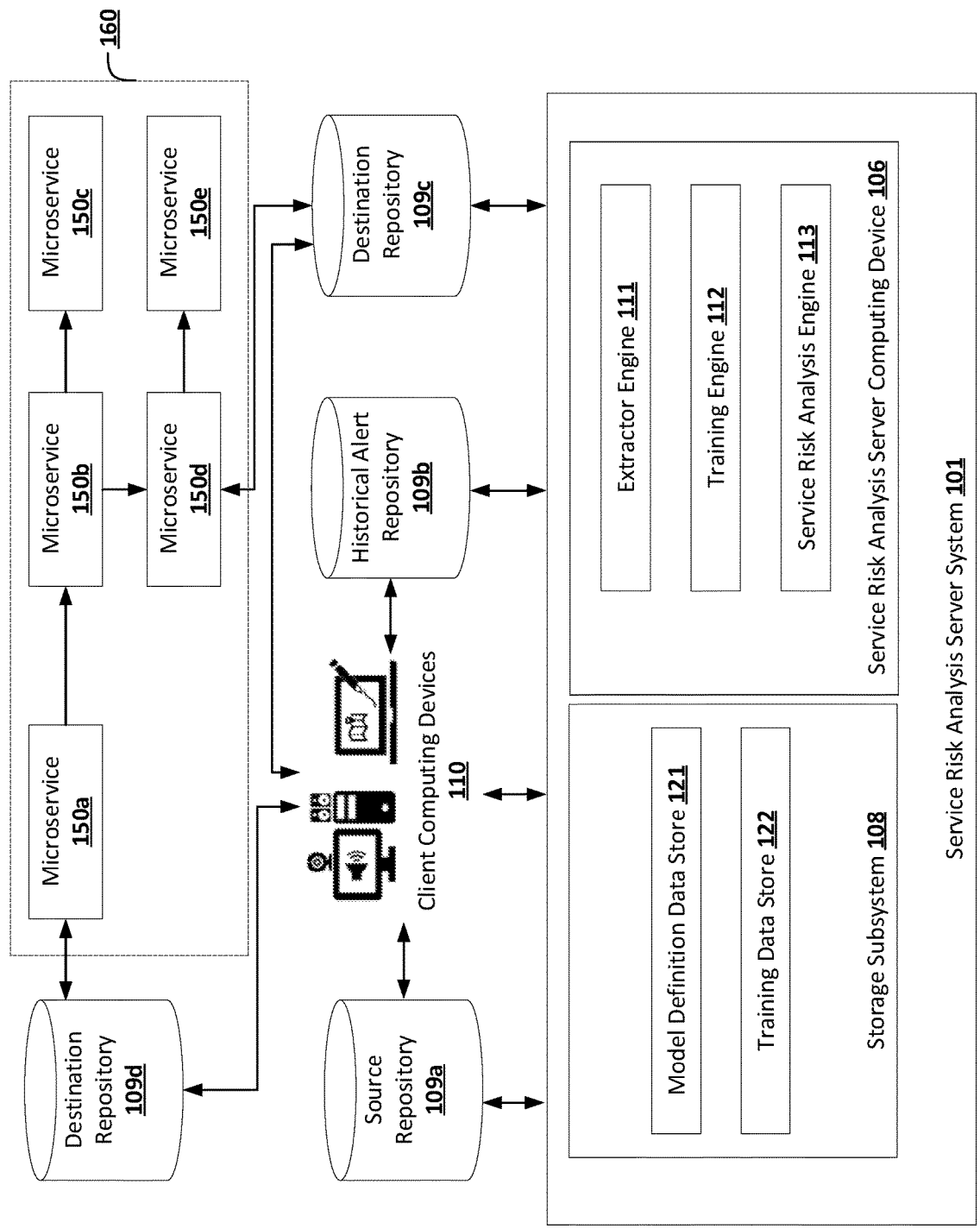
FIG. 1 is a block diagram of an example service risk analysis server system architecture within which at least some embodiments of the present invention may operate.

Various embodiments of the present disclosure will now be described more fully hereinafter with reference to the accompanying drawings, in which some, but not all embodiments of the present disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

Computing network environments, such as a federated service management platform, may have a plurality of associated microservices which are each configured to perform a particular function. Each microservice of the federated service management platform may provide a monolith service by defining a set of operations and may further be configured to integrate with one or more other microservices to perform one or more functionalities. As such, the microservices associated with the federated service management platform may have associated upstream services dependencies, from which a particular microservice depends from, as well as downstream service dependencies, which the particular microservice influences.

Due to the interconnectedness between microservices, changes in the set of operations defined by a microservice, such operations defined by associated released code objects, may impact other microservices as well. Therefore, prior to one or more modifications to a set of operations defined by a particular microservice, the impacts of the modifications should be evaluated not only with respect to the particular microservice, but also with respect to the one or more microservices that are connected to the particular microservice.

It is difficult, if not impossible, for users to manually determine the impact(s) of one or more modifications to a set of operations defined by a particular microservice, such as the merging of an unreleased code object with a particular destination repository associated with the one or more microservices, because such modifications typically have complex and unforeseen effects on interconnected (e.g., upstream or downstream) microservices. In an event an unreleased code object is merged such that is becomes part of the operations defined by a particular microservice and causes one or more alerts, this may cause disruptions to propagate throughout the federated service management platform via the one or more connected microservices, which may lead to decreased customer satisfaction and require expending both manual and computational resources to remedy. Additionally, conventional models, such as natural language processing (NLP) models, are not sufficiently equipped to process code objects and determine the effect of the one or more modifications to a set of operations defined by a particular microservice. Further complicating matters is that individual microservices themselves may be defined by complex code structures with a plurality of functions, classes, libraries, etc.

Various embodiments of the present invention address technical problems associated with automatically generating service risk analyses associated with unreleased code objects. The disclosed techniques can be utilized by a service risk analysis server system to efficiently and accurately generate a service risk analysis score data object for an unreleased code object, which may be indicative of the risk associated with merging an unreleased code object with a particular destination repository and, by extension, the effect of the unreleased code object on one or more microservices associated with the destination repository. The service risk analysis score data object may include at least one service risk analysis score indicative of the probability that the unreleased code object will cause one or more alerts in the associated microservices. In one or more embodiments, a service risk analysis interface may be generated and provided to one or more client devices such that one or more end users may be presented with the service risk analysis score for an associated unreleased code object. This may aid the one or more end users tasked with making one or more decisions regarding the unreleased code object and the potential implications of merging the unreleased code object.

Accordingly, various embodiments of the present invention reduce the amount of time an end user may take to evaluate an unreleased code object, reduce the likelihood of alerts caused by the unreleased code object, and reduce the overall expenditure of manual and computational resources to remedy alerts caused by unreleased code objects.

Definitions

As used herein, the term "service" refers to a computer functionality or a set of computer functionalities, such as the retrieval of specified information or the execution of a set of operations, with a purpose that different clients can reuse for their respective purposes, together with the policies that should control its usage, for example, based on the identity of the client (e.g., an application, etc.) requesting the service. Additionally, the service may be stored, offered, and utilized by a single computing device to local applications stored thereon and in such embodiments a network would not be required. In some embodiments, services may be accessed by other services via a plurality of APIs, for example, JavaScript Object Notation (JSON), Extensible Markup Language (XML), Simple Object Access Protocol (SOAP), Hypertext Markup Language (HTML), the like, or combinations thereof. In some embodiments, services may be configured to capture or utilize database information and asynchronous communications via message queues (e.g., Event Bus). Non-limiting examples of services include an open source API definition format, an internal developer tool, web based HTTP components, databased components, and asynchronous message queues which facilitate service-to-service communications.

The term "microservices" refers to a set of services that are interconnected and independently configured to provide a monolith service. In some embodiments, a microservice is configured with one or more APIs integrated with one or more other microservices and/or one or more other applications. In some embodiments, a microservice is a single-function module with a defined set of interfaces and/or a defined set of operations configured to integrate with one or more other microservices and/or one or more other applications to provide a monolith service. In some embodiments, microservices may be associated with one or more dependency relationships. In particular, a microservice may have an upstream dependency relationship with one or more associated upstream microservices which influence the particular microservice as well as a downstream dependency relationship with one or more associated downstream microservices which are influenced by the particular microservice.

The term "service registry" refers to a data structure configured to store information regarding one or more microservices. In some embodiments, the service registry may store the one or more upstream and or downstream dependencies of the one or more microservices within a particular federated service management platform. In some embodiments, the service registry may also store a priority classification of each microservice for the one or more microservices of the federated service management platform. For example, in some embodiments, a microservice may be categorized into a tier 1, tier 2, tier 3, tier 4, or tier 5 priority category. In some embodiments, decreasing tier levels may indicate an increase in the microservice priority. For example, the tier 5 priority category may indicate the microservice is a low priority microservice while a tier 1 priority category may indicate the microservice is a high priority microservice. The priority category a microservice belongs to may be based on a variety of factors including the interconnectedness of the microservice with other microservices (e.g., number of downstream microservices), security risk associated with the microservice, and/or the like. In some embodiments, the priority category for each microservice may be manually assigned by one or more end users and stored in the service registry.

The term "service risk analysis request" refers to a received data structure that is configured to trigger a service risk analysis engine to analyze one or more unreleased code objects and generate a service risk analysis score data object for such unreleased code object(s). The service risk analysis request may be generated by a client computing device and received by a service risk analysis server system, The service risk analysis request may be associated with service risk analysis metadata configured to describe the one or more unreleased code objects. The service risk analysis request may be generated in a variety of ways. For example, the service risk analysis request may be received in response to a user input requesting the service risk analysis request. As another example, the service risk analysis request may be automatically generated in response to receiving a pull request.

The term "service risk analysis metadata" refers to a data structure configured to describe the unreleased code object. Service risk metadata describes various properties associated with the unreleased code object such as a source repository identifier, a destination repository identifier, an unreleased code object identifier, a service identifier, a snippet identifier, a branch identifier, a workspace identifier, a scope identifier, a user identifier, one or more reviewer identifiers, one or more associated timestamps or the like. A source repository identifier and destination repository identifier may describe the source repository where the unreleased code object is currently stored and the destination repository where the unreleased code object will be merged into, respectively. A snippet identifier may describe a particular code segment of a code object, such as the unreleased code object. A branch identifier may describe a managed codeline version of a code object, such as the unreleased code object, within a repository, such as a source repository. A workspace identifier may describe a collection of repositories, snippets, branches, and/or the like. A scope identifier may describe a set of rules and/or permissions for one or more repositories, snippets, branches, and/or the like. A user identifier may describe a particular end user, such as an end user associated with generating a service risk analysis request. A reviewer identifier may describe a particular end user tasked with reviewing an unreleased code object. A timestamp may describe a particular date and/or time an unreleased code object was created, a particular date and/or time the unreleased code object last updated, a particular date and/or time a pull request was generated for the unreleased code object, and/or the like.

The term "pull request" refers to a data structure configured to describe a request to merge an unreleased code object from a source repository with a particular destination repository. The pull request is generated by a client computing device associated with a particular source repository and is received by a service risk analysis server system. A pull request indicates a particular unreleased code object currently stored in a source repository, such that the unreleased code object does not currently influence one or more services and/or microservices. The pull request also indicates a destination repository which stores one or more released code objects, wherein the one or more released code objects stored in the destination repository influence one or more services and/or microservices. In particular, the pull request is indicative of a request to merge the unreleased code object with a destination repository such that the unreleased code object may influence the one or more services and/or microservices. In some embodiments, the pull request may describe a particular code snippet identifier, branch identifier, and/or the like for a destination repository where the unreleased code object is stored and/or a particular code snippet identifier, branch identifier, and/or the like within a destination repository which the unreleased code object is designated for. The pull request may also be associated with a user identifier for a user requesting the pull request. The pull request may also be associated with one or more reviewer identifiers for one or more users tasked with reviewing the unreleased code object. In some embodiments, the generation of a pull request may also trigger the generation of a service risk analysis request such that the unreleased code object associated with the service risk analysis request. As such, a service risk analysis score data object may be generated and in some instances, provided to the one or more requesting user and one or more reviewers such that the service risk data object associated with the unreleased code object may be indicated to the one or more users during the review process.

The term "unreleased code object" refers to a data structure comprising unreleased code features. The unreleased code features comprise programming language files (e.g., JSON files, YAML files, etc.) configured to influence one or more services and/or microservices. The unreleased code object may be associated with a particular code snippet identifier, branch identifier, and/or the like within a source repository. In some embodiments, the unreleased code object may be associated with a particular code snippet identifier, branch identifier, and/or the like within a destination repository which the unreleased code object is designated for. An unreleased code object is stored in a source repository where it may be modified by one or more associated users of the source repository. In an instance a user of the one or more users is satisfied with the unreleased code object, the user may initiate a pull request for the unreleased code object via a client device such that the unreleased code object may be evaluated for merging into a destination repository by a service risk analysis server system. If the unreleased code object is determined to be satisfactory by one or more users associated with the destination repository and/or by the service risk analysis server system, the unreleased code object may be merged into the destination repository, where it may influence one or more services and/or microservices.

The term "released code object" refers to a data structure comprising one or more published code features. The published code features comprise programming language files (e.g., JSON files, YAML files, etc.) configured to influence one or more services and/or microservices. The released code object may be associated with a particular code snippet identifier, branch identifier, and/or the like within a destination repository. In some instances, a released code object may cause one or more alert indications and may therefore be associated with one or more disruptions to one or more services and/or microservices. In some embodiments, the one or more released code objects may be used in part as training feature data objects to train a service risk analysis machine learning model.

The term "service alert data object" refers to a data structure comprising one or more alert features. A service alert data object is generated by a service risk analysis server system in response to an alert from one or more services and/microservices. In some embodiments, the service alert data object may be stored in a historical alert repository and/or a training data store. In some embodiments, the one or more alert features of the service alert data object may be based at least in part on origin code data (i.e. one or more released code objects which were determined to have caused one or more alerts) and stacktrace data. The service alert data object features comprise programming language files (e.g., JSON files, YAML files, etc.), which may have negatively influenced one or more services and/or microservices. The origin code data describes the one or more released code objects, features, and/or associated metadata determined to have caused one or more alerts based at least in part on associated stacktrace data. Stacktrace data may describe a set of stack frames for a particular released code object over time such that updates and/or modifications to the code object may be determined. In some embodiments, the service alert data object may also describe an alert type, one or more mitigating actions taken to remedy the alert, one or more services and/or microservices affected by the alert, and the like.

The term "service risk analysis layer" refers to a data construct configured to extract one or more features from an unreleased code object, released code object, service alert data object, and/or the like. The service risk analysis layer is a pre-processing layer configured to extract one or more relevant features and generate one or more service risk analysis attributes and/or alert attributes. For example, the service risk analysis layer may extract one or more of variable names, function names, algorithms, variable dependencies, function dependencies, various metadata associated with the particular object and/or the like.

The term "service risk analysis attributes" refers to a data structure configured to describe one or more relevant features of an unreleased code object. The one or more service risk analysis attributes are extracted using a service risk analysis layer. The one or more service risk analysis attributes are provided as input into one or more service risk analysis machine learning models and used at least in part to determine a service risk analysis score data object. The one or more service risk analysis attributes may include one or more of variable names, function names, algorithms, variable dependencies, function dependencies, various metadata associated with the particular object and/or the like.

The term "alert attributes" refers to a data structure configured to describe one or more relevant features of a service alert data object. The one or more alert attributes are extracted using a service risk analysis layer. In some embodiments, the one or more alert attributes may serve as the one or more training service risk analysis attributes used to train the service risk analysis machine learning model. The one or more alert attributes may include one or more of variable names, function names, algorithms, variable dependencies, function dependencies, various metadata associated with the particular object and/or the like.

The term "source repository" refers to a data structure configured to store one or more unreleased code objects. The source repository is communicatively coupled to one or more client devices, and further, may be associated with one or more end users. The source repository is configured to store one or more unreleased code objects such that the unreleased code objects do not currently influence one or more components and/or services and may allow for modification of the unreleased code objects by the one or more associated users. The source repository may be associated with a source repository identifier which uniquely identifies the source repository from one or more other source repositories.

The term "destination repository" refers to a data structure configured to store one or more released code objects. The destination repository is communicatively coupled to one or more client devices, and further, may be associated with one or more users. The destination repository may be configured to store one or more released code objects such that the released code objects currently influence one or more components and/or services. The destination repository may be associated with a destination repository identifier which uniquely identifies the destination repository from one or more other destination repositories.

The term "historical alert repository" refers to a data structure configured to store one or more service alert data objects. The historical alert repository is communicatively coupled to one or more client devices. The historical alert repository is configured to store one or more alert data objects for one or more destination repositories associated with one or more alerts from the one or more destination repositories. In some embodiments, the historical alert repository may be associated a particular destination repository. The historical repository may be associated with a destination repository identifier which uniquely identifies the destination repository from one or more other destination repositories.

The term "service risk analysis machine learning model" refers to a data structure that is configured to describe parameters, hyper-parameters, and/or stored operations of a machine learning model that is configured to process one or more service risk analysis attributes associated with an unreleased code object in order to generate a service risk analysis score data object. In some embodiments, the service risk analysis machine learning model may be configured to convert the one or more service risk analysis attributes into one or more vectors. The one or more vectorized service risk analysis attributes may be compared to one or more historical code objects stored in a historical repository. In some embodiments, the service risk analysis machine learning model is a machine learning model comprising a neural network framework. In some embodiments, the service risk analysis machine learning model is a sequence-to-sequence (seq2seq) machine learning model. The generated service risk analysis score data object is configured to describe at least one service risk analysis score based at least in part on the one or more service risk analysis attributes. The at least one service risk analysis score is based at least in part on a machine learned correlation between the one or more service risk analysis attributes and one or more alert data objects stored in a historical alert repository. For example, a service risk analysis score may be a value between 0 and 1, where 0 indicates no associated risk for generating an alert and 1 indicates an absolute alert generation. As another example, a service risk analysis score may be a percentage between 0 and 100, where 0 indicates no associated risk for generating an alert and 100 indicates an absolute alert generation. In some embodiments, the service risk analysis machine learning model may be configured to update the generated service risk analysis score based at least in part on the priority category of the particular microservice with which the unreleased code object will be pushed to. In some embodiments, the service risk analysis machine learning model may access the service registry to determine the associated priority category. For example, if the microservice is a tier 1 priority category, the service analysis machine learning model may increase the service risk analysis score by a predetermined percentage and/or numerical amount, such as by 20% and/or 20. As another example, if the microservice is a tier 3 priority category, the service analysis machine learning model may increase the service risk analysis score by a lesser predetermined percentage or numerical amount, such as by 10% and/or 10. In some embodiments, the predetermined percentage and/or numerical amount the service risk analysis score is increased by may be configurable by one or more end users.

In some embodiments, the service risk analysis machine learning model may determine a predicted alert type indicative of one or more alerts the unreleased code object may cause, one or more services and/or microservices affected by the alert, and/or one or more mitigating actions indicative of one or more recommended actions that may be taken to mitigate the probability of an alert generation associated with an unreleased code object. In some embodiments, the parameters and/or hyper-parameters of a service risk analysis machine learning model may be represented as values in a one-dimensional array, such as a vector, or a two-dimensional array, such as a matrix.

The term "service risk analysis interface" refers to a formatted version of one or more service risk analysis score objects to facilitate a visualization and/or human interpretation of data associated with the service risk analysis score object via an electronic interface, such as the electronic interface of a client device. In one or more embodiments, a service risk score interface may additionally or alternatively be formatted for transmission via one or more networks. In one or more embodiments, a service risk score interface may include one or more graphical elements and/or one or more textual elements. The service risk analysis interface may include a service risk score element indicative of the service risk analysis score determined for the unreleased code object. In some embodiments, the service risk analysis interface may include a dependent service risk element indicative of one or more dependent services and/or microservices determined to be potentially affected by the unreleased code object. In some embodiments, the service risk analysis interface may include a mitigating action element indicative of one or more recommended actions that may be taken to mitigate the probability of an alert generation associated with an unreleased code object. In some embodiments, the service risk analysis interface may include a source repository element indicative of a source repository where the unreleased code object is currently stored and/or a destination repository element indicative of a destination repository where the unreleased code object is to be merged.

The terms "data," "content," "digital content," "information," and similar terms may be used interchangeably to refer to data capable of being transmitted, received, and/or stored in accordance with embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium,"

which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums can be substituted for or used in addition to the computer-readable storage medium in alternative embodiments.

The terms "client device," "computing device," "network device," "computer," "user equipment," and similar terms may be used interchangeably to refer to a computer comprising at least one processor and at least one memory. In some embodiments, the client device may further comprise one or more of: a display device for rendering one or more of a graphical user interface (GUI), a vibration motor for a haptic output, a speaker for an audible output, a mouse, a keyboard or touch screen, a global position system (GPS) transmitter and receiver, a radio transmitter and receiver, a microphone, a camera, a biometric scanner (e.g., a fingerprint scanner, an eye scanner, a facial scanner, etc.), or the like. Additionally, the term "client device" may refer to computer hardware and/or software that is configured to access a component made available by a server. The server is often, but not always, on another computer system, in which case the client accesses the component by way of a network. Embodiments of client devices may include, without limitation, smartphones, tablet computers, laptop computers, personal computers, desktop computers, enterprise computers, and the like. Further non-limiting examples include wearable wireless devices such as those integrated within watches or smartwatches, eyewear, helmets, hats, clothing, earpieces with wireless connectivity, jewelry and so on, universal serial bus (USB) sticks with wireless capabilities, modem data cards, machine type devices or any combinations of these or the like.

The term "circuitry" may refer to: hardware-only circuit implementations (e.g., implementations in analog circuitry and/or digital circuitry); combinations of circuits and one or more computer program products that comprise software and/or firmware instructions stored on one or more computer readable memory devices that work together to cause an apparatus to perform one or more functions described herein; or integrated circuits, for example, a processor, a plurality of processors, a portion of a single processor, a multicore processor, that requires software or firmware for operation even if the software or firmware is not physically present. This definition of "circuitry" applies to all uses of this term herein, including in any claims. Additionally, the term "circuitry" may refer to purpose built circuits fixed to one or more circuit boards, for example, a baseband integrated circuit, a cellular network device or other connectivity device (e.g., Wi-Fi card, Bluetooth circuit, etc.), a sound card, a video card, a motherboard, and/or other computing device.

The term "server computing device" refers to a combination of computer hardware and/or software that is configured to provide a service risk analysis score data object to a client device. An example of a server computing device is the service risk analysis server system 101 of FIG. 1. In some embodiments, a server computing device communicates with one or more client computing devices using one or more computer networks.

The term "application," "app," or similar terms refer to a computer program or group of computer programs designed for use by and interaction with one or more networked or remote computing devices. In some embodiments, an application refers to a mobile application, a desktop application, a command line interface (CLI) tool, or another type of application. Examples of an application comprise workflow engines, component desk incident management, team collaboration suites, cloud components, word processors, spreadsheets, accounting applications, web browsers, email clients, media players, file viewers, videogames, and photo/video editors. An application can be supported by one or more microservices either via direct communication with the microservice or indirectly by relying on a microservice that is in turn supported by one or more other microservices.

Thus, use of any such terms, as defined herein, should not be taken to limit the spirit and scope of embodiments of the present disclosure.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform, etc.), such as a server or other network entity, configured to communicate with one or more devices, such as one or more query-initiating computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, the like or any combination of the aforementioned devices.

FIG. 1 depicts an exemplary architecture 100, such as a federated service management platform, for generating a service risk analysis score data object. The architecture 100 includes one or more client computing devices 110, one or more repositories 109*a*-*c*, a plurality of microservices 150*a*-*e* within a service registry 160, and a service risk analysis server system 101. The federated service management platform 100 may include a plurality of microservices 150*a*-*e*. A service registry 160 may be associated with the plurality of microservices 150*a*-*e*. Each microservice 150*a*-*e* may be associated with one or more destination repositories 109*c*-*d* configured to store one or more released code objects that may be used by the particular microservice, which may be used to perform a particular task. For example, microservice 150*a* may perform operations related to user credential authorization and microservice 150b may perform operations related to fetching application content data for rendering an application home screen following successful user authentication. The microservices 150a-e which form the federated service management platform 100 may have associated upstream and/or downstream service dependencies. For example, microservice 150b may have an upstream service dependency with microservice 150a such that microservice 150b is influenced by microservice 150a. Additionally, microservice 150b may also have downstream service dependencies with microservices 150c, 150d, 150e, such that microservice 150b influences microservice 150c, 150d, and 150e, either directly or indirectly. These upstream and downstream service dependencies for each microservice may be defined in the service registry 160. Although five microservices are depicted in FIG. 1, it should be appreciated that a federated service management platform 100 may include any number of microservices with any number of upstream dependencies and/or downstream dependencies.

As previously discussed, each microservice may be associated with a particular destination repository, such as destination repository 109c and 109d. Each destination repository 109c and 109d may be configured to store one or more released code objects which currently influence one or more components and/or services. When a modification to one or more released code objects within a destination repository is desired, an unreleased code object, such as an unreleased code object stored in source repository 109a, may be merged with the destination repository. The source repository may be associated with one or more users and may be configured to store one or more unreleased code objects such that the unreleased code objects do not currently influence one or more components and/or services. The unreleased code object may be requested to be merged with a particular destination repository in a variety of ways, such as, for example, via a pull request. Each destination repository 109c and 109d as well as the source repository 109a may be communicatively coupled, such as via a wired or wireless network connection, to one or more client computing devices such that they are accessible to said one or more client computing devices.

Similarly, a historical alert repository 109b may also be communicatively coupled, such as via a wired or wireless network connection, to one or more client computing devices such that they are accessible to said one or more client computing devices. The historical alert repository 109b may be configured to store one or more service alert data objects. In an event that an alert for one or more microservices is generated, which may be caused by, for example, the merging of an unreleased code object with a destination repository, a service alert data object may be generated and stored in the historical alert repository 109b.

A service risk analysis server system 101 may also be communicatively coupled, such as via a wired or wireless network connection, to one or more client computing devices such that they are accessible to said one or more client computing devices. The service risk analysis server system 101 is configured to store training data and model definition data in a storage subsystem 108, receive service risk analysis requests, extract one or more service risk analysis attributes using the service risk analysis server computing device 106, generate a service risk analysis score data object using the service risk analysis server computing device 106, train one or more service risk analysis machine learning models using the service risk analysis server computing device 106, and provide generated service risk score interface data to client computing devices 110 in response to service risk analysis requests as transmitted by a client computing device 110.

The storage subsystem 108 of the service risk analysis system 101 may be configured to store one or more unreleased code objects, one or more released code objects, and/or one or more service alert data objects. The service risk analysis server system 101 may be communicatively coupled to one or more repositories, such as source repository 109a, destination repository 109c, and/or historical alert repository 109b and may retrieve the one or more unreleased code objects, one or more released code objects, and/or one or more alert data from the respective repository and store the objects in the storage subsystem 108. Additionally or alternatively, the service risk analysis system 101 may be configured to store data associated with a service risk analysis request in storage subsystem 108.

The service risk analysis server computing device 106 of the service risk analysis server system 101 includes an extractor engine 111, a training engine 112, and a service risk analysis engine 113. The extractor engine 111 may be configured to extract one or more service risk analysis attributes based at least in part on an unreleased code object using a service risk analysis layer. The service risk analysis engine 113 may be configured to generate a service risk analysis score data object based at least in part on the one or more service risk analysis attributes using one or more service risk analysis machine learning models. The training engine 112 may be configured to train the one or more service risk analysis machine learning models in accordance with the training data stored in the storage subsystem 108, such as within training data store 122.

The service risk analysis server computing device 106 may be configured to train one or more service risk analysis machine learning models based at least in part on the training data store 122 stored in the storage subsystem 108 and by utilizing training engine 112, store trained the one or more trained service risk analysis machine learning models as part of the model definition data store 121 stored in the storage subsystem 108, and utilize the one or more trained service risk analysis machine learning models to generate service risk analysis score data objects based at least in part on a service risk analysis request, which may be provided by a client computing entity 110.

Exemplary Service Risk Analysis Server Computing Device

Figure 2:
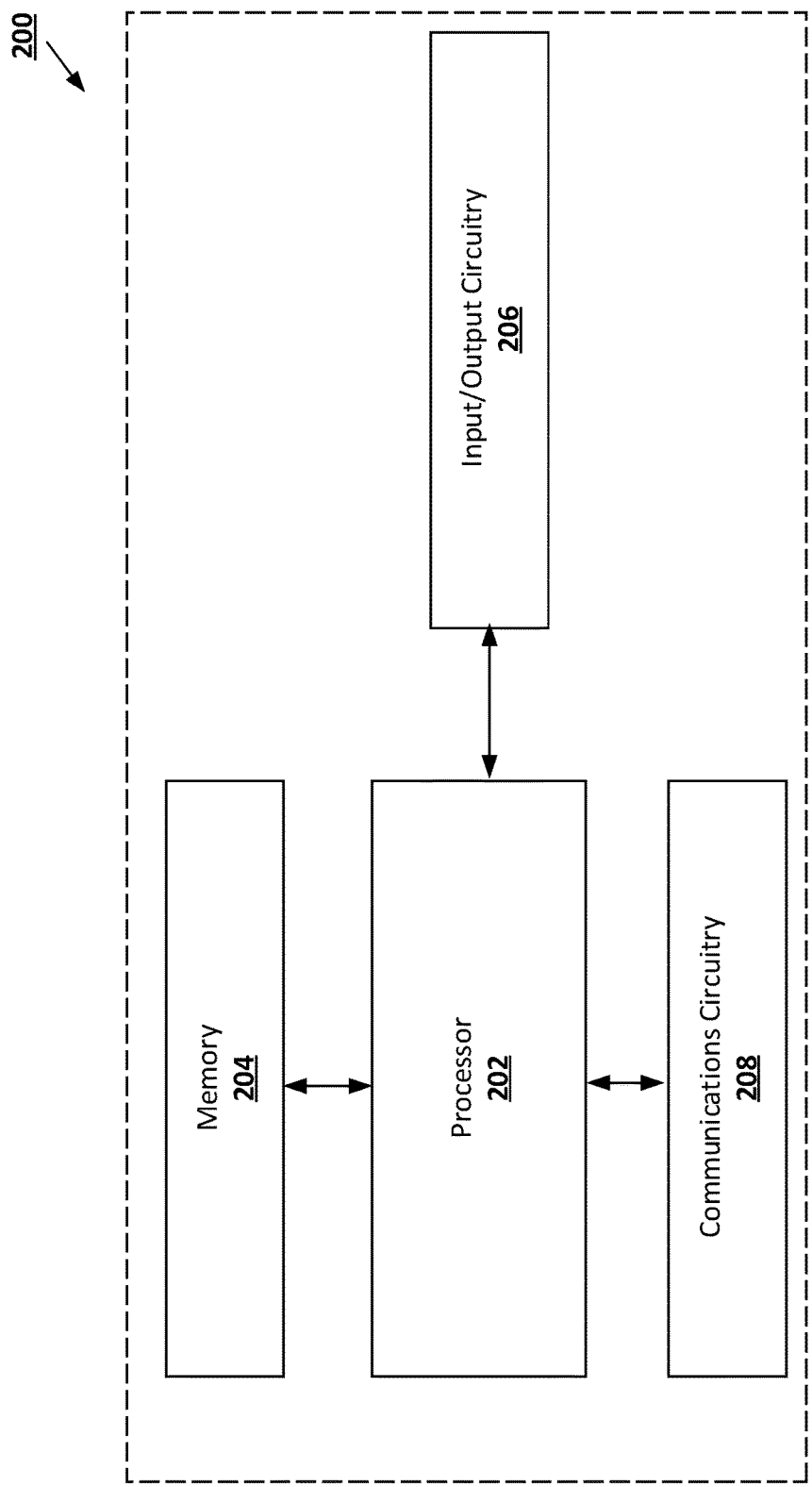
FIG. 2 is a block diagram of an example service risk analysis server computing device structured in accordance with at least some embodiments of the present invention.

The service risk analysis server computing device 106 may be embodied by one or more computing systems, such as apparatus 200 shown in FIG. 2. The apparatus 200 may include processor 202, memory 204, input/output circuitry 206, and communications circuitry 208. The apparatus 200 may be configured to execute the operations described herein. Although these components 202-208 are described with respect to functional limitations, it should be understood that the particular implementations necessarily include the use of particular hardware. It should also be understood that certain of these components 202-208 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a query-initiating computing device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally, or alternatively, the communications circuitry 208 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Exemplary Client Computing Device

Figure 3:
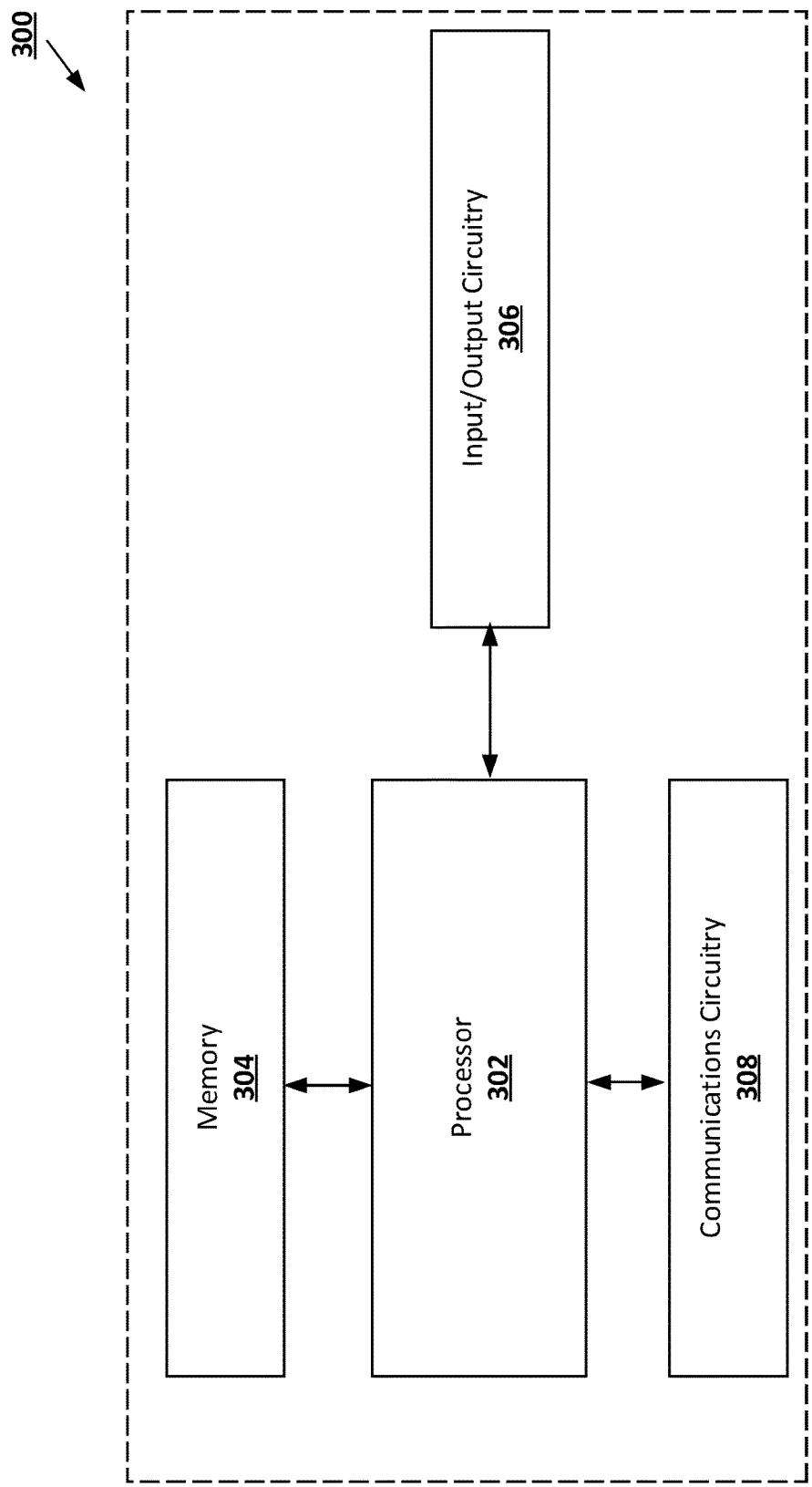
FIG. 3 is a block diagram of an example client computing device structured in accordance with at least some embodiments of the present invention.

Referring now to FIG. 3, a client computing device 110 may be embodied by one or more computing systems, such as apparatus 300 shown in FIG. 3. The apparatus 300 may include processor 302, memory 304, input/output circuitry 306, and a communications circuitry 308. Although these components 302-308 are described with respect to functional limitations, it should be understood that the particular implementations necessarily include the use of particular hardware. It should also be understood that certain of these components 302-308 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may include one or more databases. Furthermore, the memory 304 may be configured to store information, data, content, applications, instructions, or the like for enabling the apparatus 300 to carry out various functions in accordance with example embodiments of the present invention.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions (e.g., computer program instructions), the instructions may specifically configure the processor 302 to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display, and may comprise a web user interface, a mobile application, a query-initiating computing device, a kiosk, or the like.

In embodiments in which the apparatus 300 is embodied by a limited interaction device, the input/output circuitry 306 includes a touch screen and does not include, or at least does not operatively engage (i.e., when configured in a table mode), other input accessories such as tactile keyboards, track pads, mice, etc. In other embodiments in which the apparatus is embodied by a non-limited interaction device, the input/output circuitry 306 may include may include at least one of a tactile keyboard (e.g., also referred to herein as keypad), a mouse, a joystick, a touch screen, touch areas, soft keys, and other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally, or alternatively, the communications circuitry 308 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Example Data Flows and Operations

Figure 4:
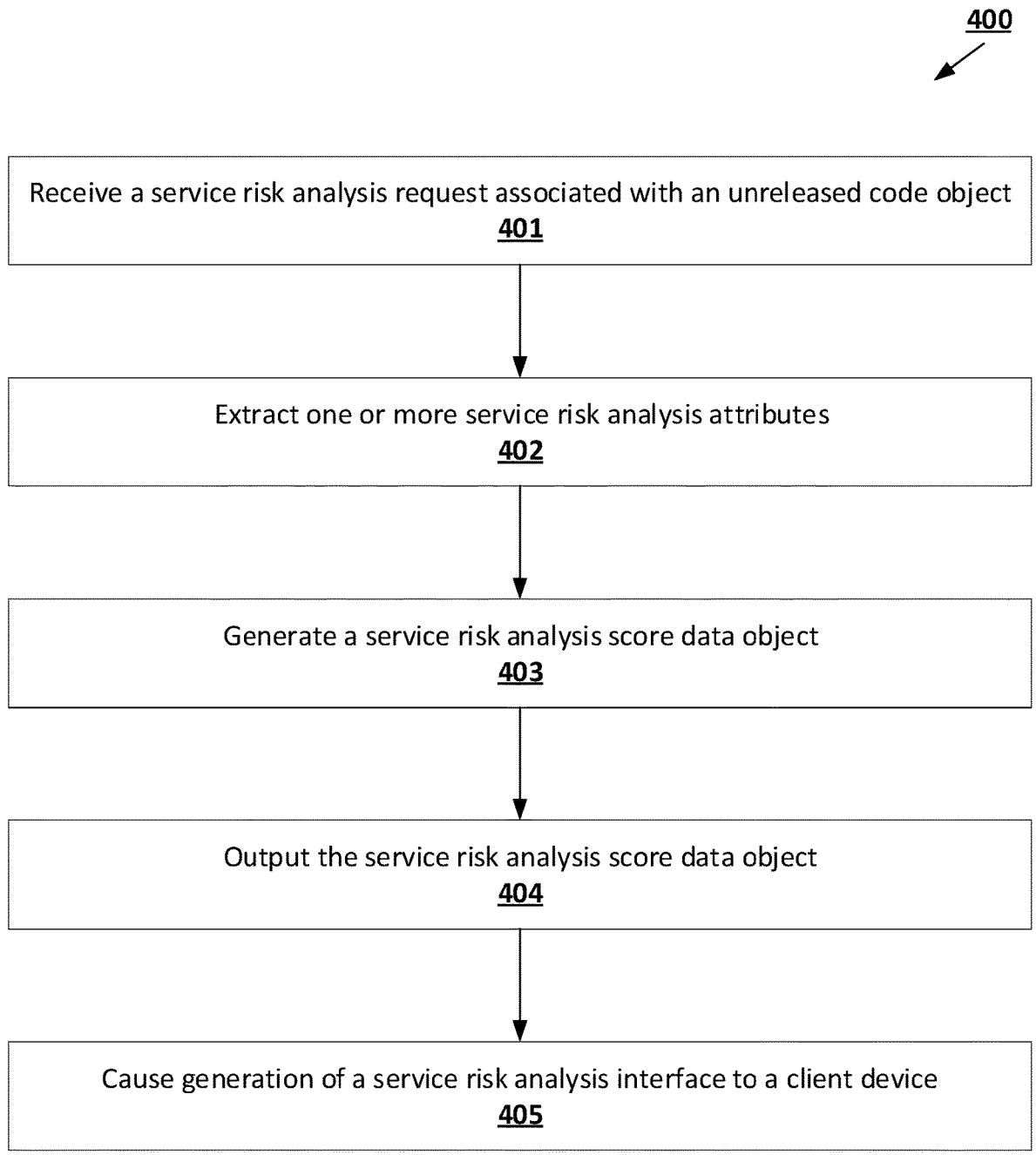
FIG. 4 is a flowchart diagram of an example process for performing operations that are configured to generate a service risk analysis score data object in accordance with at least some embodiments of the present invention.

FIG. 4 is a flowchart diagram of an example process 400 for generating a service risk analysis score data object. Via the various operations of the process 400, the service risk analysis server computing device 106 can generate and output a service risk analysis score data object for an unreleased code object. In some embodiments, the service risk analysis server computing device 106 may further include causing the generation of a service risk analysis interface to a client device.

The process 400 begins at operation 401 when the service risk analysis server computing device 106 of the service risk analysis server system 101 receives a service risk analysis request associated with an unreleased code object. In some embodiments, the service risk analysis server computing device 106 may receive the service risk analysis request directly from one or more client devices 110. For example, the service risk analysis server computing device 106 may receive a service risk analysis request from a client device 110 for an unreleased code object currently stored in the source repository 109a associated with the client device 110. In some embodiments, the service risk analysis request may include service risk analysis metadata which describes various properties of the unreleased code object. For example, service risk analysis metadata may describe a source repository identifier, a destination repository identifier, an unreleased code object identifier, a service identifier, a snippet identifier, a branch identifier, a workspace identifier, a scope identifier, a user identifier, one or more reviewer identifiers, one or more associated timestamps, and/or the like.

Figure 5:
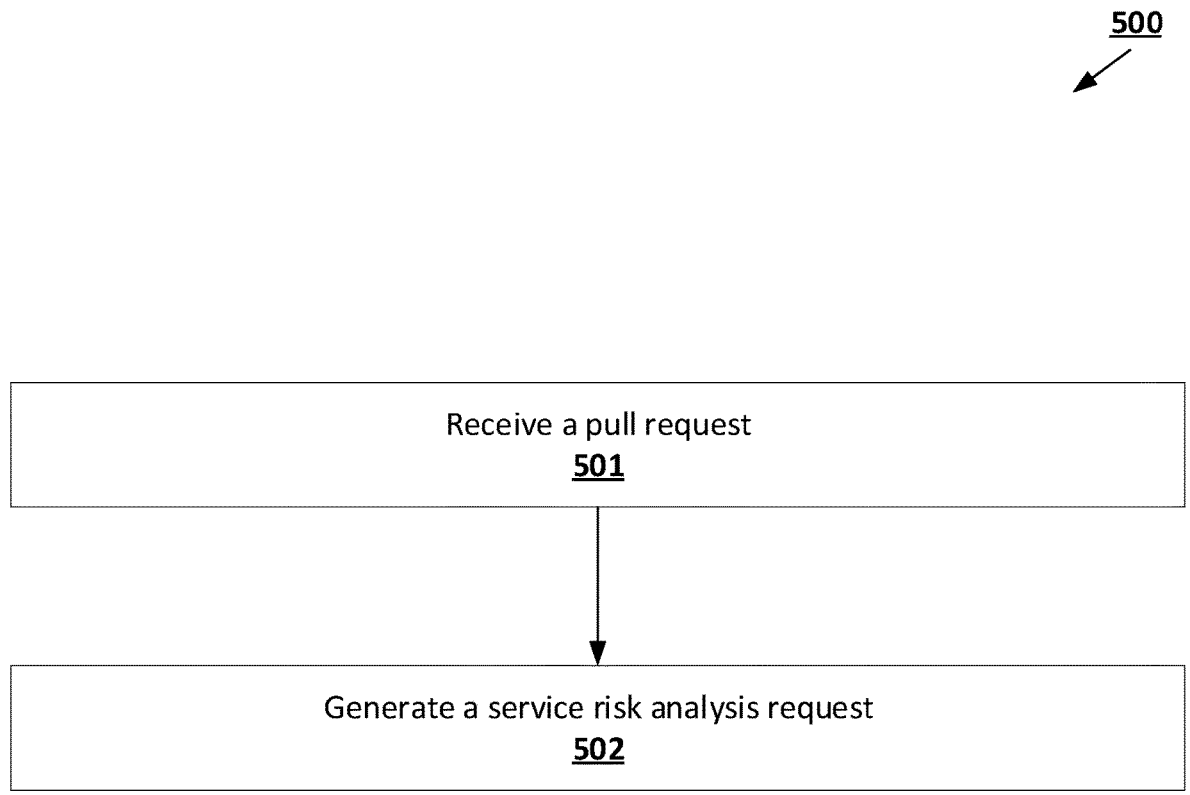
FIG. 5 is a flowchart diagram of an example process for generating a service risk analysis request in accordance with at least some embodiments of the present invention.

In some embodiments, operation 401 may be performed in accordance with the various steps/operations of the process depicted in FIG. 5, which is a flowchart diagram of an example process for generating a service risk analysis request in response to receiving a pull request.

The process 500 begins at operation 501 when the service risk analysis server computing device 106 of the service risk analysis server system 101 receives a pull request. The pull request may be a user-initiated request configured to facilitate the merging of an unreleased code object from a source repository to a destination repository. Prior to merging the unreleased code object from the source repository to the destination repository, where it may influence the operation of one or more microservices, the unreleased code may be evaluated. In some embodiments, the unreleased code object may be evaluated by one or more reviewers and the service risk analysis server computing device 106. In some embodiments, the unreleased code object may be evaluated automatically by the service risk analysis server computing device 106.

The pull request may describe a particular unreleased code object currently stored in a source repository such as by the particular code snippet identifier, branch identifier, source repository identifier and/or the like for the unreleased code object. When stored within the source repository, the unreleased code object does not influence one or more services and/or microservices. The pull request may further describe a location to merge the unreleased code object within the particular destination repository, such as by a particular code snippet identifier, branch identifier, destination repository identifier and/or the like. In some embodiments, the pull request may further describe one or more reviewer identifiers indicative of one or more end user tasked with reviewing an unreleased code object, a title for the unreleased code object, a description for the unreleased code object, a historical modification object for the unreleased code object, one or more timestamps describing a particular date and/or time an unreleased code object was created, a particular date and/or time the unreleased code object last updated, a particular date and/or time a pull request was generated for the unreleased code object, and/or the like.

Figure 8:
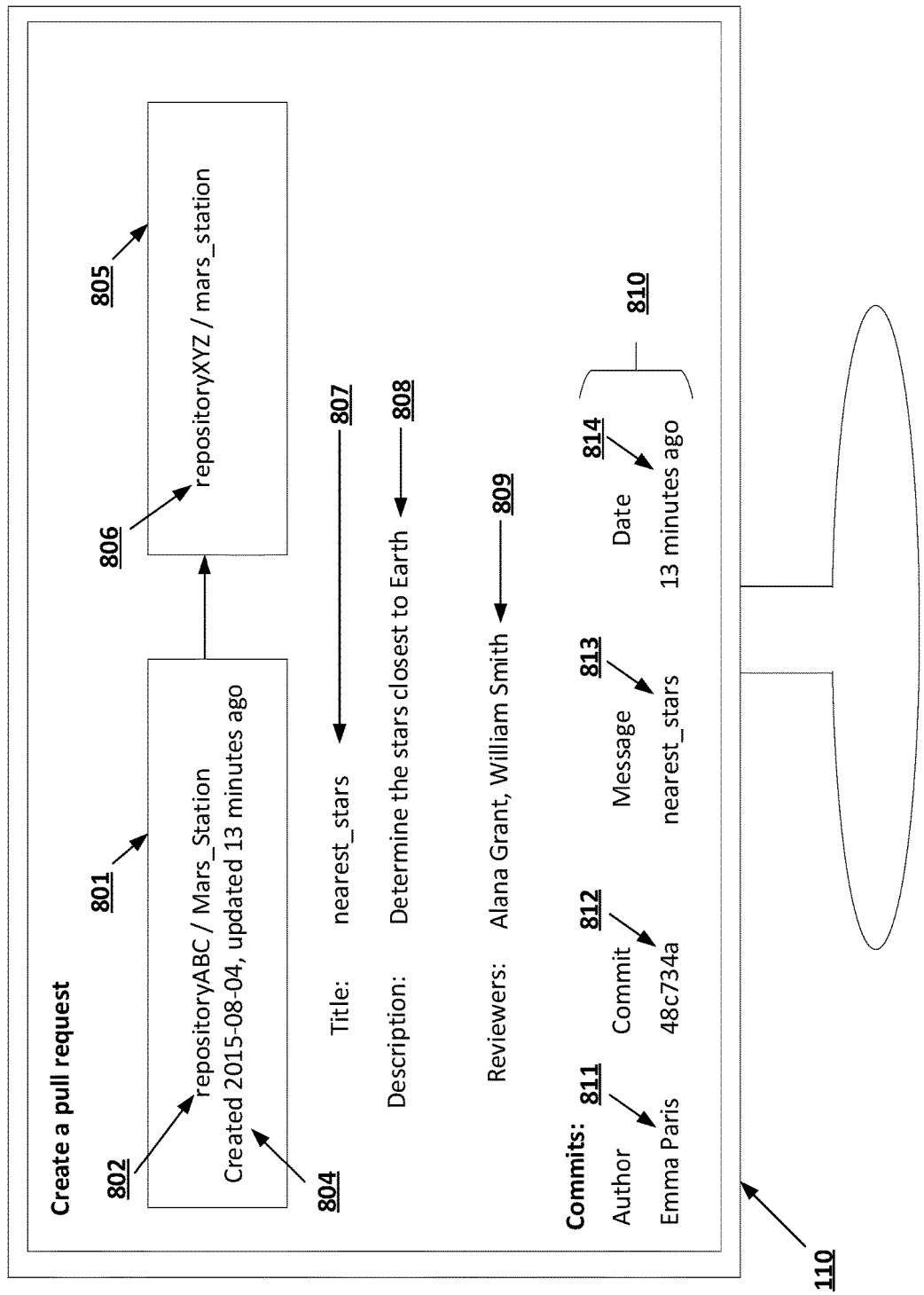
FIG. 8 illustrates an example pull request user interface in accordance with one or more embodiments of the present disclosure.

FIG. 8 depicts an example pull request 800 in accordance with one or more embodiments of the present disclosure. The pull request may be displayed on a user interface (e.g., a graphical user interface) of a client device (e.g., the client device 110) to facilitate user interaction with the pull request 800. The pull request 800 may include a source repository object 801, which describes at least a source repository identifier 802. The source repository object 801 may also describe a branch identifier, snippet identifier, and/or the like. In some embodiments, the source repository object 801 may include a timestamp 804 indicative of when the pull requested was generated. The pull request may further include a destination repository object, which describes at least a destination repository identifier 806. The destination repository object 805 may also describe a branch identifier, snippet identifier, and/or the like.

In some embodiments, the pull request includes one or more descriptors to describe the unreleased code object, such as a title 807 for the unreleased code object and a description 808 of the unreleased code object. The pull request may also include one or more reviewer identifiers 809, which describe one or more end users tasked with reviewing the unreleased code object. In some embodiments, the pull request may further include one or more historical modification object 810 indicative of one or more previous pull requests for the unreleased code object. The historical modification object 810 may include a requesting user identifier 811, a pull request identifier 812, a description of the pull request 813, a timestamp 814 describing a particular date and/or time an unreleased code object was created, a particular date and/or time the unreleased code object last updated, a particular date and/or time a pull request was generated for the unreleased code object, and/or the like.

At operation 502, the service risk analysis server computing device 106 of the service risk analysis server system 101 generates a service risk analysis request based at least in part on the pull request. In some embodiments, the service risk analysis server computing device 106 may automatically generate the service risk analysis request in response to receiving the pull request. The service risk analysis server computing device 106 may include service risk analysis metadata in the service risk analysis request based at least in part on the received pull request.

Returning now to FIG. 4, at operation 402, the extractor engine 111 of the service risk analysis server computing device 106 may extract one or more service risk analysis attributes based at least in part on the unreleased code object by using a service risk analysis layer. In some embodiments, the one or more service risk analysis attributes may describe one or more relevant features of an unreleased code object. For example, the one or more service risk analysis attributes may include one or more programming language files, code snippets, service risk analysis metadata, and/or the like.

At operation 403, the service risk analysis engine 113 of the service risk analysis server computing device 106 may generate a service risk analysis score data object based at least in part on the one or more service risk analysis attributes. The service risk analysis engine 113 may process the one or more service risk analysis attributes using one or more service risk analysis machine learning models. The one or more service risk analysis machine learning models may generate a service risk analysis score data object, which may include at least one service risk analysis score based at least in part on the one or more service risk analysis attributes. The at least one service risk analysis score may be based at least in part on a machine learned correlation between the one or more service risk analysis attributes and the one or more service alert data objects stored in a historical repository. As such, the service risk analysis score may be indicative of an overall risk associated with merging the unreleased code object with a destination repository.

In some embodiments, the service risk analysis machine learning model may be configured to update the generated service risk analysis score based at least in part on the priority category of the particular microservice with which the unreleased code object will be pushed to. In some embodiments, the service risk analysis machine learning model may access the service registry 160 to determine the associated priority category. For example, if the microservice is a tier 1 priority category, the service analysis machine learning model may increase the service risk analysis score by a predetermined percentage and/or numerical amount, such as by 20% and/or 20. As another example, if the microservice is a tier 3 priority category, the service analysis machine learning model may increase the service risk analysis score by a lesser predetermined percentage or numerical amount, such as by 10% and/or 10. In some embodiments, the predetermined percentage and/or numerical amount the service risk analysis score is increased by may be configurable by one or more end users.

In some embodiments, the service risk analysis score data object may further include one or more predicted alerts indicative of the likelihood that the unreleased code object may cause the one or more alerts described by the one or more predicted alerts if the unreleased code object was merged with a destination repository. The one or more predicted alerts may be based at least in part on the one or more service alert data objects stored in the historical repository.

In some embodiments, the service risk analysis score data object may further include one or more dependent services configured to describe one or more microservices that may potentially be affected by the merging of the unreleased code object with the destination repository. The one or more dependent services may be one or more microservices with downstream dependencies on the particular microservice associated with the destination repository with which the unreleased code object is to be merged.

In some embodiments, the service risk analysis score data object may further include one or more mitigating actions configured to describe one or more actions that may be taken to mitigate the at least one service risk analysis score determined for the unreleased code object. For example, the one or more mitigating actions may include recommendations such as, do not push the unreleased code object to the destination repository, change one or more features in the unreleased code object and before pushing to the destination repository, proceed to push the unreleased code object to the destination repository, and/or the like.

A service risk analysis machine learning model may be configured to process one or more service risk analysis attributes associated with an unreleased code object in order to generate a service risk analysis score data object. The service risk analysis machine learning model may be configured to process one or more service risk analysis attributes associated with an unreleased code object in order to generate a service risk analysis score data object. In some embodiments, the service risk analysis machine learning model is a machine learning model comprising a neural network framework. The at service risk analysis score data object may be based at least in part on a machine learned correlation between the one or more service risk analysis attributes and one or more alert data objects stored in a historical alert repository. For example, a service risk analysis score may be a value between 0 and 1, where 0 indicates no associated risk for generating an alert and 1 indicates an absolute alert generation. As another example, a service risk analysis score may be a percentage between 0 and 100, where 0 indicates no associated risk for generating an alert and 100 indicates an absolute alert generation. In some embodiments, the service risk analysis machine learning model may determine a predicted alert type indicative of one or more alerts the unreleased code object may cause and/or one or more mitigating actions indicative of one or more recommended actions that may be taken to mitigate the probability of an alert generation associated with an unreleased code object. In some embodiments, the parameters and/or hyper-parameters of a service risk analysis machine learning model may be represented as values in a one-dimensional array, such as a vector, or a two-dimensional array, such as a matrix.

Figure 6:
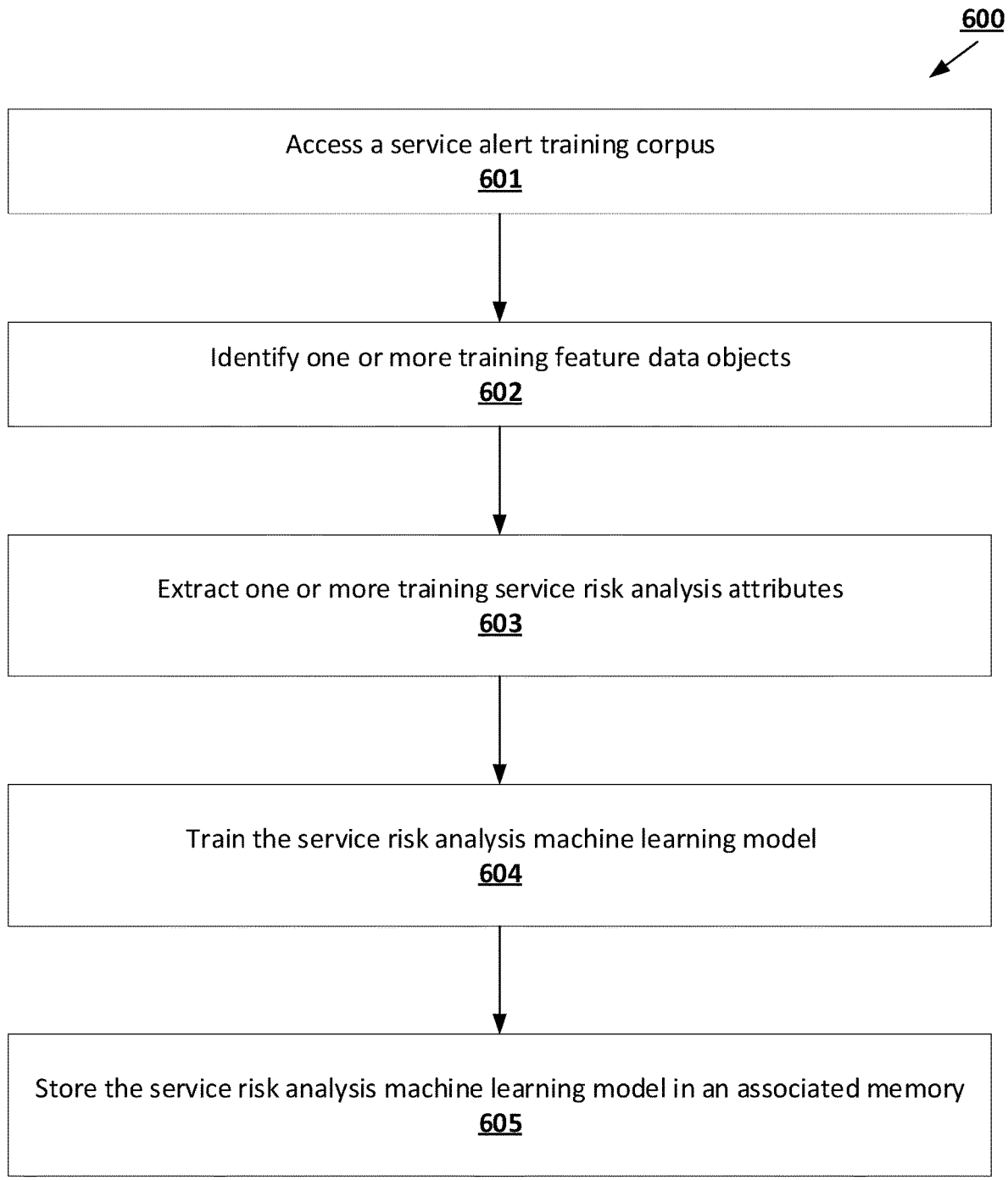
FIG. 6 is a flowchart diagram of an example process for performing a service risk analysis generation routine to train a service risk analysis machine learning model in accordance with at least some embodiments of the present invention.

In some embodiments, operation 403 may be performed in accordance with the various operations of the process depicted in FIG. 6, which is a flowchart diagram of an example process for training a particular service risk analysis machine learning model.

The process 600 begins at operation 601 when the training engine 112 of the service risk analysis server computing device 106 accesses a service alert training corpus. The service alert training corpus may include a training routine for the service risk analysis machine learning model that may be stored in the training data store 122 of the storage subsystem 108. The service alert training corpus may include a plurality of service alert data object, stacktrace data, and/or origin code data. A service alert data object may include one or more alert features that may be based at least in part on origin code data (i.e. one or more released code objects which were determined to have caused one or more alerts) and stacktrace data. For example, a service alert data object may describe origin code data associated with causing an alert for a particular microservice as determined at least in part by associated stacktrace data. In some embodiments, the service alert training corpus may further include origin code data pertaining to one or more released code objects determined to not have caused an alert. The generation of service alert data object, stacktrace data, and/or origin code data is discussed in more detail in FIG. 7.

Figure 7:
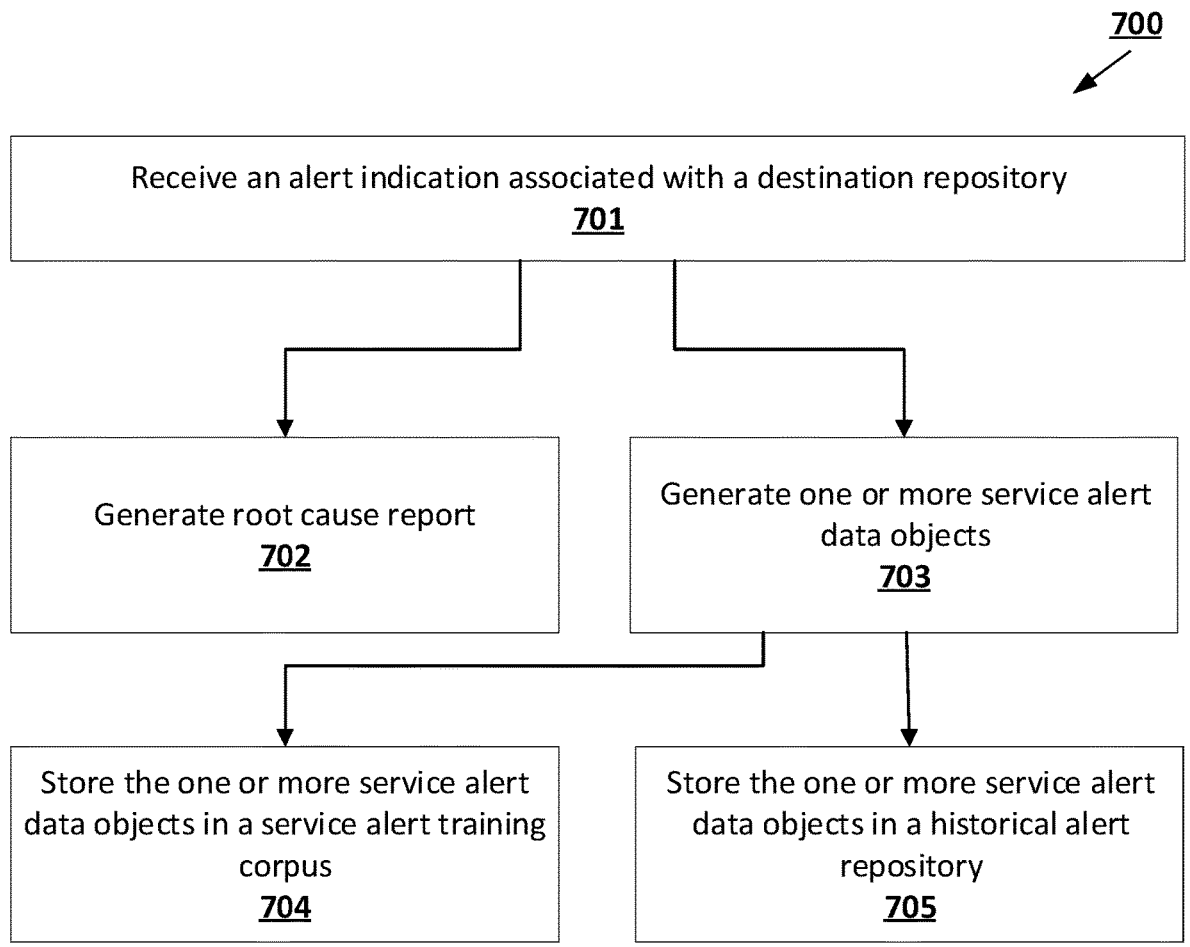
FIG. 7 is a flowchart diagram of an example process for receiving an alert indication associated with a destination repository in accordance with at least some embodiments of the present invention.

In some embodiments, certain aspects of operation 601 may be performed in accordance with the various operations of the process depicted in FIG. 7, which is a flowchart diagram of an example process for receiving an alert indication associated with a destination repository.

At operation 701, the service risk analysis server computing device 106 may receive an alert indication associated a particular microservice associated with a particular destination repository. In some instances, a released code object within a destination repository may cause one or more alert indications such that one or more disruptions to one or more services and/or microservices. The alert indication may be caused by an unreleased code object that has recently been merged with a destination repository associated with a particular microservice. For example, if an unreleased code object stored in source repository 109a is merged with destination repository 109c, the unreleased code object may cause one or more alert indications in microservice 150d and/or microservice 150e.

At operation 702, the service risk analysis server computing device 106 may generate a root cause report. The root cause report may be indicative of the cause of an alert. For example, the root cause report may include stacktrace data, origin code data, one or more timestamps, and/or the like. Stacktrace data within the root cause report may be indicative of origin code data determined to have caused the alert indication. In some embodiments, the root cause report may further include one or more mitigating actions taken to remedy the alert caused by the origin code data. As such, the origin code data, which may include one or more released code objects, determined to have caused the alert indication as well as the one or more actions taken to remedy the alert may be known.

Additionally or alternatively, at operation 703, the service risk analysis server computing device 106 may generate one or more service alert data objects. The one or more service alert data objects may include one or more alert features. In some embodiments, the one or more alert features may be based at least in part on origin code data (i.e. one or more released code objects which were determined to have caused one or more alerts) and stacktrace data. The service alert data object features may comprise programming language files (e.g., JSON files, YAML files, etc.) associated with origin code data determined to have negatively influenced one or more services and/or microservices. The origin code data may describe the one or more released code objects, features, and/or associated metadata determined to have caused one or more alerts based at least in part on associated stacktrace data. In some embodiments, the one or more alert features may describe an alert type, one or more mitigating actions taken to remedy the alert, one or more services and/or microservices affected by the alert, and/or the like.

Additionally or alternatively, at operation 704, the service risk analysis server computing device 106 may store the one or more alert data objects in a service alert training corpus. In some embodiments, the service alert training corpus may include a training routine for the service risk analysis machine learning model that may be stored in the training data store 122 of the storage subsystem 108. As such, the one or more alert data objects may be added to the training data store 122 and used to train a service risk analysis machine learning model. In some embodiments, the service risk analysis server computing device 106 may select a particular service alert training corpus in which to store the one or more alert data objects. For example, the service risk analysis server computing device 106 may select a service alert training corpus associated with a particular destination repository identifier.

Additionally or alternatively, at operation 705, the service risk analysis server computing device 106 may store the one or more alert data objects in a historical alert repository. The one or more alert data objects stored within the historical alert repository may be used at least in part by one or more service risk analysis machine learning models during generation of a service risk analysis score data object. For example, a service risk analysis machine learning model may compare one or more service risk analysis attributes associated with an unreleased code object to the one or more alert attributes described by the one or more alert data objects in the historical alert repository to determine a machine learned correlation. The at least one service risk analysis score described by the service risk analysis score data object may be based at least in part on the machine learned correlation between the one or more service risk analysis attributes associated with an unreleased code object to the one or more alert attributes described by the one or more alert data objects in the historical alert repository. In some embodiments, the historical alert repository may be associated with a particular destination repository identifier.

Returning now to FIG. 6, at operation 602, the training engine 112 of the service risk analysis server computing device 106 may identify one or more training feature data objects. The training engine 112 may identify one or more training feature data objects based at least in part on the plurality of service alert data objects and/or associated service alert data object metadata. As such, one or more of the plurality of training feature data objects may be identified as training feature data objects based at least in part on the one or more alert features described the service alert data object and the associated service alert data object metadata. For example, one or more service alert data objects may be identified as one or more training objects based at least in part on the destination repository identifier described in their associated service alert data object metadata. That is, service alert data objects associated with a particular destination repository may be identified as one or more training feature data objects by the training engine 112. As such, a service risk analysis machine learning model may be trained based at least in part on a specific destination repository.

At operation 603, the extractor engine 111 and/or alternatively, the training engine 112, of the service risk analysis server computing device 106 may extract the one or more training service risk analysis attributes from the service alert training corpus using a service risk analysis processing layer. The training service risk analysis attributes may be extracted based at least in part on the identified training feature data objects. In some embodiments, the one or more training service risk analysis attributes may describe one or more relevant features of the one or more training feature data objects. For example, the one or more training service risk analysis attributes may include one or more programming language files, code snippets, service alert data object metadata, and/or the like. In some embodiments, both the training engine 112 and service risk analysis engine 113 may use the service risk analysis processing layer of extractor engine 111 to extract one or more training service risk analysis attributes and/or one or more service risk analysis attributes.

At operation 604, the training engine 112 of the service risk analysis server computing device 106 may train the service risk analysis machine learning model. The service risk analysis machine learning model may be trained using any suitable training techniques, such as by using an optimization algorithm. Via such training techniques, the service risk analysis machine learning model may be trained to determine a machine learned correlation between the one or more service risk analysis attributes and the one or more alert features described by one or more service alert data objects stored in the historical alert repository.

The service risk analysis machine learning model may be re-trained periodically, semi-periodically, or in response to a training event. A training event may include one or more events which trigger the retraining of the service risk analysis machine learning model. For example, a training event may include a user request to retrain the service risk analysis machine learning model. As another example, a training event may include receiving an alert indication. In this way, the service risk analysis machine learning model may be iteratively trained and updated such that the at least one service risk analysis score described by the service risk analysis score data object reflects an accurate determination of the risk score associated with merging an unreleased code object with a destination repository.

At operation 605, the training engine 112 of the service risk analysis server computing device 106 may store the service risk analysis machine learning model in an associated memory, such as in model definition data store 121 of the storage subsystem 108. The trained service risk analysis machine learning model may be accessed by the service risk analysis engine 113 of the service risk analysis server computing device 106, such as for use in conjunction with the operations described in FIG. 4.

Returning now to FIG. 4, at operation 404, the service risk analysis engine 113 of the service risk analysis server computing device 106 may output the service risk analysis score data object. The service risk analysis engine 113 may output the service risk analysis score data object such that it may be provided to one or more computing entities, such as one or more client computing devices 110.

In some embodiments, one or more end users may opt-in to a program to allow for one or more automatic predictive actions to be performed based at least in part on the service risk analysis score data object. In some embodiments, an end user may opt-in to a program that allows him/her to set one or more service risk score thresholds and one or more corresponding actions in response to determining a service risk score that satisfies the one or more service risk score thresholds. For example, a user may configure the service risk analysis server computing device 106 to automatically deny a pull request in an instance the service risk analysis score associated with the pull request is below a particular service risk analysis score threshold. As another example, a user may configure the service risk analysis server computing device 106 to automatically approve a pull request in an instance the service risk analysis score associated with the pull request is above a particular service risk analysis score threshold. As yet another example, a user may configure the service risk analysis server computing device 106 to recommend manual review of a pull request in an instance the service risk analysis score associated with the pull request is satisfies one or more service risk analysis score thresholds and fails one or more other service risk analysis score thresholds.

At operation 405, the service risk analysis server computing device 106 of the services risk analysis server system 101 may cause the generation of a service risk analysis interface on one or more client devices 110. The service risk analysis interface may include multiple areas, where each area may be situated in relation to one or more other interface areas of the electronic interface. An interface area may be comprised of groupings of pixels, or may be defined according to coordinates of a display device configured to render the interface. A size of an interface may be adjusted according to parameters associated with the display device. An interface area may include one or more interface elements. For example, an interface element may include a visualization. In certain embodiments, an interface area may include one or more graphical elements and/or or more textual elements. In certain embodiments, an interface area may be void of an interface element and/or a visualization. In certain embodiments, an interface area may include a search graphical control element and/or one or more other interactive interface elements.

In particular, the service risk analysis interface may include a service risk score element which is rendered based at least in part on the service risk analysis score data object. The service risk score element may indicate the at least one service risk analysis score as described by the service risk analysis score data object. As such, end users of the one or more client devices 110 may be made aware of the associated risk associated with merging the unreleased code object with the destination repository, thus allowing the one or more end users, such as one or more authors of the unreleased code object and/or one or more reviewers of the unreleased code object, to make a more informed decision regarding whether to merge the unreleased code object with the destination repository.

In some embodiments, the service risk analysis interface may further include a source repository element and/or a destination repository element based at least in part on the service risk analysis metadata. The service repository element may indicate the source repository where the unreleased code object is currently stored and the destination repository element may indicate the destination repository where the unreleased code object is to be merged.

In some embodiments, the service risk analysis interface may further include a dependent service risk element based at least in part on the service risk analysis score data object. The dependent service risk element may indicate one or more microservices that may potentially be affected by the merging of the unreleased code object with the destination repository. The one or more microservices with downstream dependencies on the particular microservice associated with the destination repository with which the unreleased code object is to be merged. In some embodiments, the dependent service risk element may also be associated with a predicted alert element and/or a mitigating action element.

In some embodiments, the service risk analysis interface may further include a predicted alert element based at least in part on the service risk analysis score data object. The predicted alert element may indicate one or more potential alerts that may be caused by the unreleased code object if the unreleased code object was merged with a destination repository. The one or more predicted alerts may be based at least in part on the one or more service alert data objects stored in the historical repository. In some embodiments, the predicted alert element may also be associated with a dependent service risk element and/or a mitigating action element.

In some embodiments, the service risk analysis interface may further include a mitigating action element based at least in part on the service risk analysis score data object. The mitigating action element may indicate one or more actions that may be taken to mitigate the at least one service risk analysis score determined for the unreleased code object. For example, the one or more mitigating actions may include recommendations such as, do not push the unreleased code object to the destination repository, change one or more features in the unreleased code object and before pushing to the destination repository, proceed to push the unreleased code object to the destination repository, and/or the like. In some embodiments, the mitigating action element may also be associated with a dependent service risk element and/or a predicted alert element.

Figure 9:
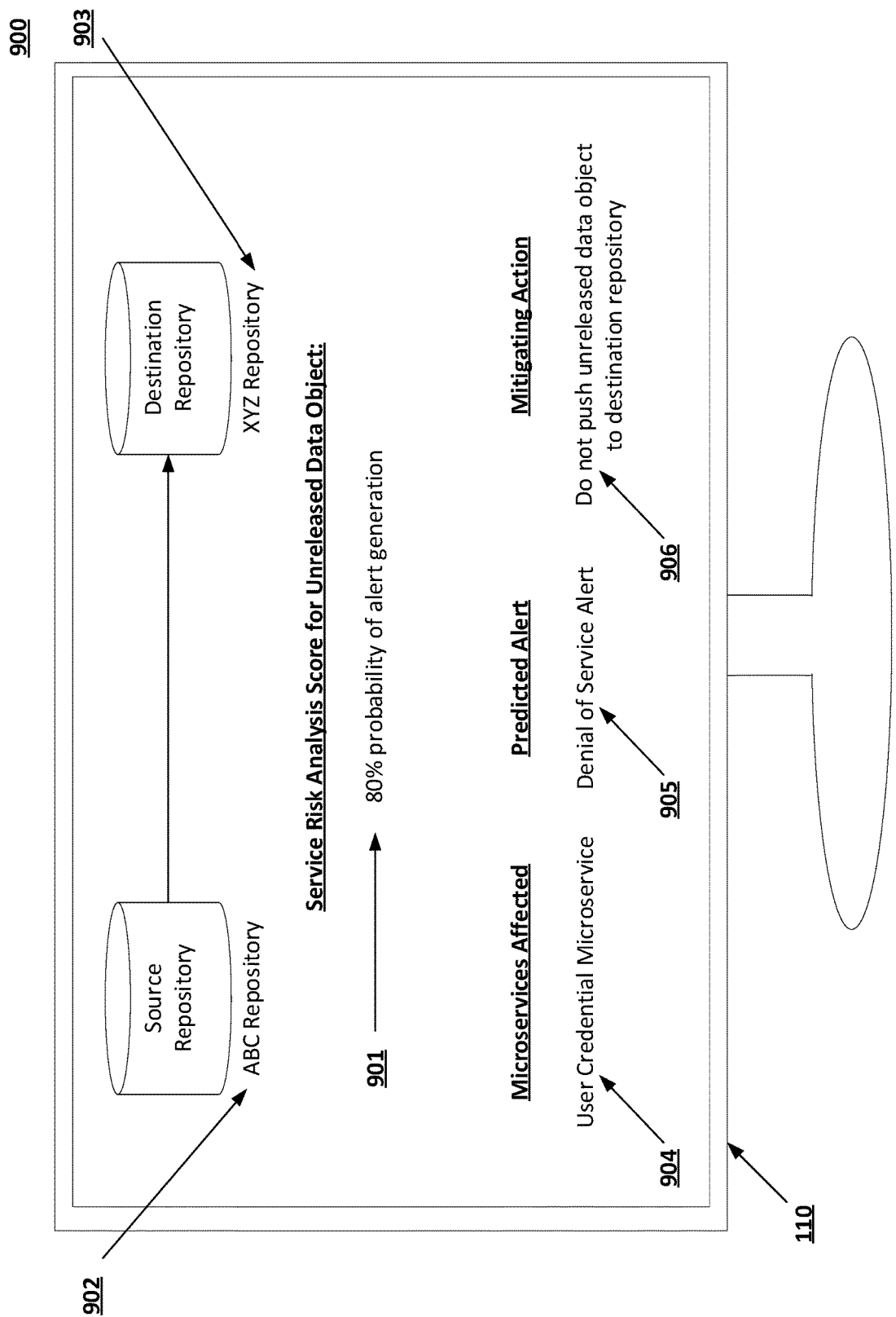
FIG. 9 illustrates an example service risk analysis user interface in accordance with one or more embodiments of the present disclosure.

FIG. 9 depicts an example service risk analysis interface 900 in accordance with one or more embodiments of the present disclosure. The service risk analysis interface may be displayed on a user interface (e.g., a graphical user interface) of a client device (e.g., the client device 110) to facilitate user interaction with the service risk analysis interface 900. The service risk analysis interface 900 may include a service risk score element 901, source repository element 902, destination repository element 903, dependent service risk element 904, predicted alert element 905, mitigating action element 906, and/or the like.

In some embodiments, the service risk analysis interface 900 may be visually depicted in a variety of ways. For example, the service risk score element 901 may be colored such that the particular color of the service risk score element 901 is indicative of a service risk analysis score category to which the service risk analysis score belongs. For example, a service risk score which belongs to a low risk service risk analysis category may be green in color, a service risk score which belongs to a medium risk service risk analysis category may be yellow in color, or a service risk score which belongs to a high risk service risk analysis category may be red in color.

As such, the end users of a client device may be presented with an overview of the risk associated with the unreleased code object if merged with the destination repository. In this way, the one or more end users, such as one or more authors associated with the unreleased code object and/or one or more reviewers tasked with reviewing the unreleased code object, may easily view the risk associated with the unreleased code object if merged with the destination repository as well, at least in some embodiments, as the one or more microservices that may be affected, the types of alerts that may be generated, and/or one or more recommended actions to mitigate the risk associated with the unreleased code object.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web components, web services, web microservices, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's query-initiating computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a query-initiating computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., a Hypertext Markup Language (HTML) page) to a query-initiating computing device (e.g., for purposes of displaying information/data to and receiving user input from a user interacting with the query-initiating computing device). Information/data generated at the query-initiating computing device (e.g., a result of the user interaction) can be received from the query-initiating computing device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a product or packaged into multiple products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. A computer-implemented method, comprising:
receiving a service risk analysis request associated with an unreleased code object;
extracting, using a service risk analysis layer, one or more service risk analysis attributes based at least in part on the unreleased code object, wherein the one or more service risk analysis attributes are associated with a service risk analysis metadata, and the service risk analysis metadata describes at least a source repository identifier and a destination repository identifier;
generating, using a service risk analysis machine learning model, a service risk analysis score data object based at least in part on the one or more service risk analysis attributes, wherein the service risk analysis score data object comprises (i) at least one service risk analysis score indicative of a probability that the unreleased code object will cause one or more alerts in one or more associated microservices and (ii) one or more predicted alert types, wherein the one or more predicted alert types are indicative of one or more mitigating actions which, when executed, reduce a probability that the unreleased code object will cause one or more alerts in one or more associated microservices, and wherein the service risk analysis machine learning model is trained based at least in part on a plurality of service alert data objects comprising one or more alert types; and
outputting the service risk analysis score data object.

2. The computer-implemented method of claim 1, wherein the service risk analysis metadata further includes at least one of an unreleased code object identifier, a service identifier, a snippet identifier, a branch identifier, a workspace identifier, a scope identifier, a user identifier, one or more reviewer identifiers or one or more associated timestamps.

3. The computer-implemented method of claim 1, wherein:
the at least one service risk analysis score is based at least in part on the one or more service risk analysis attributes, and
the at least one service risk analysis score is based at least in part on a machine learned correlation between the one or more service risk analysis attributes and one or more service alert data objects of the plurality of service alert data objects, wherein the plurality of service alert data objects is stored in a historical alert repository.

4. The computer-implemented method of claim 3, wherein:
the unreleased code object is associated with a source repository, and
the one or more service alert data objects are associated with a destination repository indicated in the service risk analysis request.

5. The computer-implemented method of claim 1, wherein:
receipt of the service risk analysis request is triggered by receiving a pull request, wherein the pull request comprises at least a source repository identifier, an unreleased code object identifier, and a destination repository identifier.

6. The computer-implemented method of claim 1, wherein generating the service risk analysis score data object further comprises:
determining a priority category for a microservice of a destination repository with which the unreleased code object is associated with; and
updating the service risk analysis score data object based at least in part on the determined priority category of the corresponding microservice.

7. The computer-implemented method of claim 1, further comprising:
causing generation of a service risk analysis interface on one or more client devices, wherein the service risk analysis interface comprises a service risk score element rendered based at least in part on the service risk analysis score data object.

8. The computer-implemented method of claim 7, wherein the service risk analysis interface further comprises at least one of a source repository element or a destination repository element rendered based at least in part on a service risk analysis metadata.

9. The computer-implemented method of claim 7, wherein the service risk analysis interface further comprises a predicted alert element rendered based at least in part on the service risk analysis score data object.

10. The computer-implemented method of claim 7, wherein the service risk analysis interface further comprises a dependent service risk element based at least in part on the service risk analysis score data object.

11. The computer-implemented method of claim 7, wherein the service risk analysis interface further comprises a mitigating action element based at least in part on the service risk analysis score data object.

12. A computer-implemented method for training a service risk analysis machine learning model, the computer-implemented method comprising:
accessing a service alert training corpus comprising a plurality of service alert data objects, stacktrace data, and origin code data, wherein the plurality of service alert data objects comprise one or more alert types;
identifying one or more training feature data objects from the plurality of service alert data objects;
extracting, utilizing a service risk analysis layer, one or more training service risk analysis attributes from the service alert training corpus based at least in part on the identified training feature data objects, wherein the one or more training service risk analysis attributes are associated with a service risk analysis metadata, and the service risk analysis metadata describes at least a source repository identifier and a destination repository identifier;
training the service risk analysis machine learning model based at least in part on the one or more training service risk analysis attributes to generate a service risk analysis score data object for an unreleased code object, wherein the service risk analysis score data object comprises (i) at least one service risk analysis score indicative of a probability that the unreleased code object will cause one or more alerts in one or more associated microservices and (ii) one or more predicted alert types, wherein the one or more predicted alert types are indicative of one or more mitigating actions which, when executed, reduce a probability that the unreleased code object will cause one or more alerts in one or more associated microservices; and
re-training the service risk analysis machine learning model in response to a training event.

13. The computer-implemented method of claim 12, further comprising:
receiving an alert indication associated with a destination repository associated with the service risk analysis machine learning model;
generating one or more service alert data objects based at least in part on the received alert indication; and
storing the one or more service alert data objects in the service alert training corpus.

14. The computer-implemented method of claim 13, further comprising:
storing the one or more service alert data objects in a historical alert repository.

15. The computer-implemented method of claim 13, further comprising:
in response to receiving the alert indication, generating a root cause report, wherein the root cause report is indicative of the cause of the alert and one or more mitigating actions taken in response to the alert indication.

16. The computer-implemented method of claim 12, wherein generating the service risk analysis score data object utilizing the service risk analysis machine learning model is based at least in part on a machine learned correlation between one or more service risk analysis attributes and one or more origin code objects described by one or more service alert data objects stored in a historical alert repository.

17. The computer-implemented method of claim 12, further comprising:
storing the service risk analysis machine learning model in an associated memory.

18. A computer program product, stored on a non-transitory computer-readable medium, comprising instructions that when executed by one or more computers cause the one or more computers to:
receive a service risk analysis request associated with an unreleased code object;
extract, using a service risk analysis layer, one or more service risk analysis attributes based at least in part on the unreleased code object, wherein the one or more service risk analysis attributes are associated with a service risk analysis metadata, and the service risk analysis metadata describes at least a source repository identifier and a destination repository identifier;
generate, using a service risk analysis machine learning model, a service risk analysis score data object based at least in part on the one or more service risk analysis attributes, wherein the service risk analysis score data object comprises (i) at least one service risk analysis score indicative of a probability that the unreleased code object will cause one or more alerts in one or more associated microservices and (ii) one or more predicted alert types, wherein the one or more predicted alert types are indicative of one or more mitigating actions which, when executed, reduce a probability that the unreleased code object will cause one or more alerts in one or more associated microservices, and wherein the service risk analysis machine learning model is trained based on a plurality of service alert data objects comprising one or more alert types; and
output the service risk analysis score data object.

19. The computer program product of claim 18, wherein:
the at least one service risk analysis score is based at least in part on the one or more service risk analysis attributes, and
the at least one service risk analysis score is based at least in part on a machine learned correlation between the one or more service risk analysis attributes and one or more service alert data objects stored in a historical alert repository.

* * * * *

UNITED STATES PATENT AND TRADEMARK OFFICE
CERTIFICATE OF CORRECTION

| | | |
|---|---|---|
| PATENT NO. | : 12,282,383 B2 | Page 1 of 1 |
| APPLICATION NO. | : 17/449042 | |
| DATED | : April 22, 2025 | |
| INVENTOR(S) | : Muralidharan et al. | |

It is certified that error appears in the above-identified patent and that said Letters Patent is hereby corrected as shown below:

On the Title Page

Item (71), Applicants, "ATLASSIAN, INC." should read --ATLASSIAN US, INC.--.

Signed and Sealed this
Eighteenth Day of November, 2025

John A. Squires
*Director of the United States Patent and Trademark Office*